Patented Feb. 25, 1930

1,748,668

UNITED STATES PATENT OFFICE

CHARLES C. BOMBERGER, OF ST. OLAF, IOWA

BUTTER-COMPOSITION TEST

No Drawing. Application filed April 14, 1927. Serial No. 183,914.

This invention relates to a process of testing butter to determine the percentage of ingredients therein contained.

The object of the invention is to provide a process for determining the percentage of the various ingredients contained in butter which can be made quickly and economically by any one of ordinary intelligence and without the use of expensive apparatus.

Another object thereof is to provide a process for testing butter which involves the agency of heat alone for making the test.

Another object thereof is to provide a process for testing butter whereby only one sample is required for the various steps in the process.

It is a set rule in the art that butter must contain a minimum of 80 percent butter fat in the finished product; and in many localities there are statutes to the effect that the finished product must contain at least that percentage of butter fat.

It is therefore desirable that a simple test be provided whereby it can be easily determined if the butter contains that percentage of fat. A creamery in order to have a market for its product and to comply with the rule and to conform with the various statutes must necessarily have certain methods to determine if their product is up to standard; or a jobber or dealer handling butter must be convinced that the product which he is handling measures up to these standards. It is also profitable to the creamery to know if the milk and cream which they are purchasing will make butter complying with the necessary requirements.

Butter in its finished form contains certain percentages of fat, water, curd and salt. Heretofore the process employed for ascertaining the percentages of these ingredients was an acid test which required numerous articles and costly acids and these tests could only be made by a chemist or an expert skilled in the art. This test required several steps, several samples, an outlay of the expensive apparatus comprising much glassware which resulted in considerable breakage thereof.

The process as employed in this invention requires but the single agency of heat, in any form, and a single pan. In carrying out the present test, a sample of butter of known weight, for example, 10 grams, is placed in a pan, it being ascertained beforehand the weight of such a pan. The pan containing the butter is then placed over a suitable source of heat, which may be an alcohol burner, and which will provide a temperature of over 212 degrees Fahrenheit, and kept at such heat until the sample stops bubbling and is a golden brown in color. At this stage all the water has been evaporated from the sample. The pan is then cooled and the sample reweighed. The difference in weight is the amount of water the sample contained.

The next step is to replace the remainder of the sample over the heat and let it remain until the sample ignites in the pan. That part of the sample burning is pure fat and it is then held away from the stove, or other source of heat, until the fat is entirely consumed and the flame in the pan has died out. The pan is then cooled and the sample reweighed. The loss found at this weighing designates the amount of butter fat the sample contained.

The residue in the pan is salt and curd and the color thereof is black, due to the smoke caused by the burning fat, which would naturally cause discoloration of this residue.

The pan containing this residue is again put over a source of heat until the contents of the pan is nearly white. At this stage it is found that the curd is completely burned out. The pan is then cooled and contents weighed, the balance left in the pan designates the amount of salt the sample contained.

It has been found preferable in making this test to use the metric system of weighing, as the differences in weights may be multiplied by 10 to give the percentage of the loss of weight. In actual practice it will be found that 10 grams of butter is sufficient for a sample and that by using this amount the weights will read the percentages direct, for example, 10 grams of butter is placed in a pan and heated over a flame of sufficient temperature to evaporate the water as explained above, upon reweighing it is found that the sample now weighs 1 gram and 6 decigrams less than the original sample when first placed in the pan and by multiplying by ten it will be found that 16 percent of the sample has been dissipated, which was the water contained in the sample.

Again applying the second step of the process and the fat having been burned, upon reweighing it is found that the sample now only weighs 4 decigrams. It is, therefore, proof that the butter fat weighed 8 grams or the sample contained 80 percent butter fat.

Applying the third step of the process after the curd has been burned out and the residue of the pan weighs but 1 decigram, it therefore shows that 1 percent of the original sample is curd and that the difference, 3 percent, last remaining is salt.

In the old method which was very complicated and required several samples, the time required for making the test was from 40 to 60 minutes and up to several hours by the more complicated chemical tests.

In the process herein explained the time required is but from 7 to 8 minutes and only one sample is used.

It can therefore be readily seen that the present process is more economical and requires less time than the previous methods, it being not necessary to employ a chemist or one thoroughly skilled in the art to conduct this test as it may be done by any person of ordinary intelligence.

Of course, it is understood that any agency of heat may be employed, and any amount of butter may be used, and that minor changes may be made in any of the steps of the process without departing from the spirit and scope of the invention or sacrificing any of its advantages.

The invention is claimed as follows:

1. The steps in the process of testing butter to determine the percentage of ingredients contained therein which consists in heating and igniting a predetermined amount of butter until all the water is evaporated and the fat consumed, and then weighing the residue to determine the combined amount of water and fat contained in the butter.

2. The steps in the process of testing butter to determine the percentage of ingredients contained therein which consists in heating a predetermined amount of butter until all the water is evaporated therefrom, weighing the residue to determine the amount of water contained in the original sample, then igniting the residue to burn all the fat therefrom, and then reweighing the balance to determine the percentage of fat contained in the original sample.

3. The steps in the process of testing butter to determine the percentage of ingredients contained therein which consists in heating and igniting a sample of butter of known weight until all the water is evaporated therefrom and the fat consumed, weighing the residue to determine the amount of water and fat contained in the original sample, then heating the residue until the curd is completely burned, and then reweighing the balance to determine the amount of curd contained in the original sample.

4. The steps in the process of testing butter to determine the percentage of ingredients contained therein which consists in heating a sample of butter of known weight, igniting the same until all the fat is consumed, heating the balance of the sample until the curd is completely burned, and then reweighing the residue after each operation to determine the amount of water, fat and curd contained in the original sample.

5. The process of testing butter to determine the percentage of ingredients contained therein which consists in heating a sample of butter of known weight until all the water is evaporated therefrom, cooling the sample and reweighing the same to ascertain the percentage of loss, igniting the remaining part of the sample until all the fat is burned out, cooling the sample and reweighing the same to ascertain the weight of the fat, heating the residue until the same is nearly white, and then reweighing the sample to determine the amount of the curd and the salt in the original sample.

6. The process of testing butter to determine the percentage of ingredients contained therein which consists in placing a sample of butter of known weight in a pan subjected to heat until the sample is a golden brown in color to signify that the water is all evaporated from the sample, cooling the balance of the sample and reweighing the same for ascertaining the amount of water said sample contained, igniting the remainder of the sample until the fat is consumed, cooling the pan and contents after the burning is completed, reweighing the same to determine the amount of fat the sample contained, reheating the sample until the residue thereof is nearly white, cooling the sample and reweighing the same to ascertain the amount of curd burned out and for determining the amount of salt therein contained.

7. The process of testing butter by alternately heating and cooling a sample of butter of known weight three times until various ingredients have become dissipated and weighing the sample before and after each heat to determined the percentage of the ingredients contained in said butter.

CHARLES C. BOMBERGER.